United States Patent

Johnson

[15] 3,659,763
[45] May 2, 1972

[54] HYDRAULIC CYLINDER SUPPORT FOR TRACTORS

[72] Inventor: Doyle A. Johnson, R.R. 3 Box 52, Paulding, Ohio 45879

[22] Filed: June 29, 1970

[21] Appl. No.: 50,865

[52] U.S. Cl. ................................................. 224/42.45 R
[51] Int. Cl. ............................................................ B60r 9/06
[58] Field of Search ............... 172/809; 224/42.45; 214/620; 248/301, 304

[56] References Cited

UNITED STATES PATENTS

| | | |
|---|---|---|
| 2,477,980 | 8/1949 | Hardy et al. .................... 280/150 F |
| 2,903,147 | 9/1959 | Davis, Jr. ............................ 214/384 |
| 2,465,133 | 3/1949 | Toffolon ............................. 214/621 |
| 2,675,139 | 4/1954 | Mercier et al. ..................... 214/621 |
| 3,396,862 | 8/1968 | Fischer .............................. 214/620 |

Primary Examiner—Gerald M. Forlenza
Assistant Examiner—Lawrence J. Oresky
Attorney—Clarence A. O'Brien and Harvey B. Jacobson

[57] ABSTRACT

An inclined bracket having a hooked end is secured to a tractor chassis and provides a means for supporting an auxiliary hydraulic motor during periods when the motor is not in use. The bracket includes an abutment which engages the hydraulic motor. This abutment serves as a mechanical stop restraining the motor from unwanted motion when the tractor is moving.

2 Claims, 4 Drawing Figures

Patented May 2, 1972  3,659,763

Doyle A. Johnson
INVENTOR.

BY *Clarence A. O'Brien
and Harvey B. Jacobson*
Attorneys

HYDRAULIC CYLINDER SUPPORT FOR TRACTORS

The present invention relates to brackets and more particularly to a special purpose bracket for supporting a hydraulic motor on the chassis of a tractor.

During recent years, modern farm machinery has progressed to a state which enables various tractor implements to be driven by a single auxiliary hydraulic motor of the hydraulic cylinder type. The hydraulic motor is connected to the central hydraulic system of the tractor. A problem arises as to where to place the auxiliary hydraulic motor when implements are being changed or during periods of time when implements are not in use. It is extremely important to refrain from placing the auxiliary motor on the ground or in another place where it may become subjected to abrasive dirt. It is impractical to have an individual hold the motor for any length of time inasmuch as these motors generally weigh approximately 80 pounds. Accordingly, it would be tremendously convenient for the farmer to have a suitable bracket on the tractor chassis so that he could hang the auxiliary motor on the bracket when its use is unnecessary or during implement change-over.

The present invention is directed to such a bracket which is particularly suited for supporting an auxiliary hydraulic motor on the tractor chassis. Each time the motor is removed from a drawn implement it is simply placed on the bracket. An abutment forms part of the bracket and serves as a mechanical stop to restrain the mounted motor from unwanted motion during such time when the tractor is moving.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
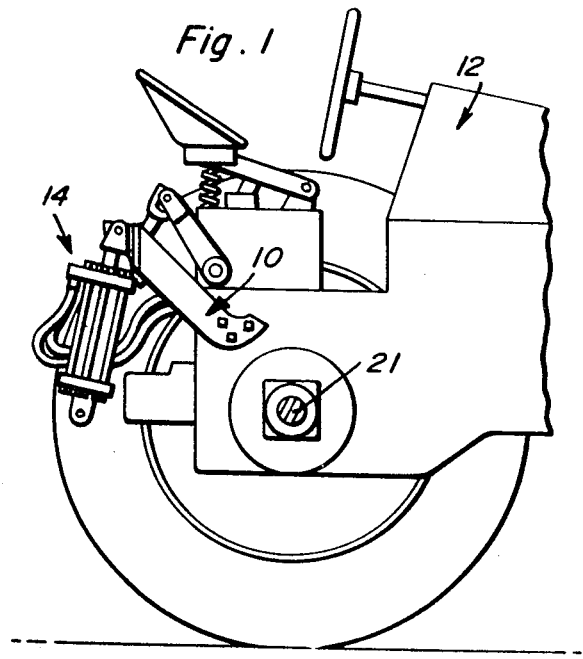
FIG. 1 is a partial elevational view illustrating an auxiliary hydraulic motor mounted to the bracket of the present invention.

Referring to the figures and more particularly FIG. 1, reference numeral 10 generally indicates a bracket which forms the present invention. The bracket is shown more clearly in FIG. 2. As indicated in FIG. 1, the bracket is mounted on the rear end portion of a tractor 12 and serves to support a conventional auxiliary hydraulic motor 14.

Figure 4:
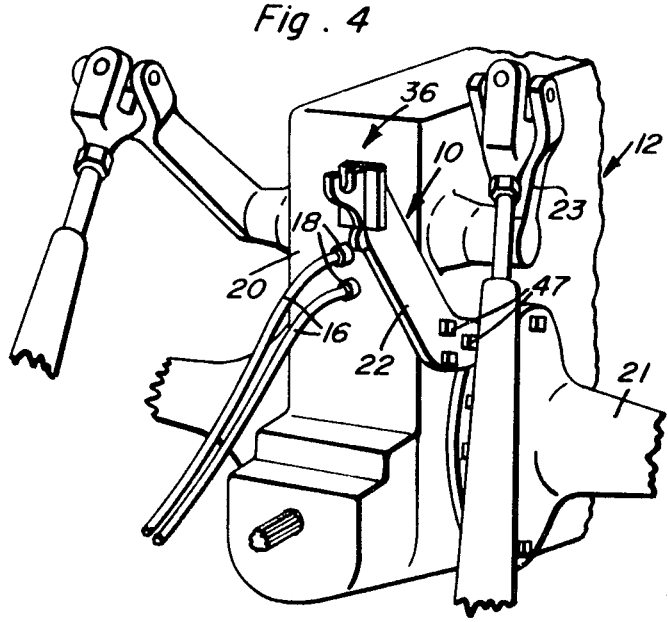
FIG. 4 is a perspective view illustrating the mounting of the bracket on a tractor chassis.

In FIG. 4 the bracket 10 is shown to be secured at a lower end thereof to a vertical lateral surface of the tractor chassis at a point proximate the place where hydraulic pressure lines 16 are connected to the usual hydraulic fittings 18, these located on the tractor chassis portion 20. As shown, the bracket may be conveniently located above the rear axle 21 and below one of the hitch lift links 23.

Figure 2:
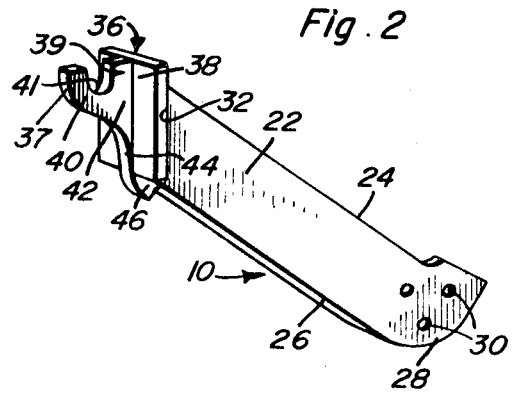
FIG. 2 is a perspective view of the present bracket.
Figure 3:
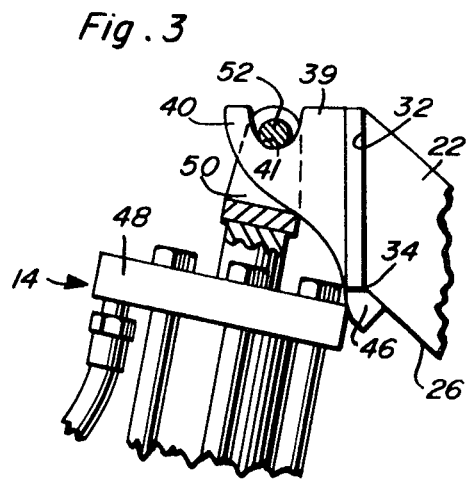
FIG. 3 is a partial elevational view illustrating the engagement between the hooked end of the bracket and an auxiliary hydraulic motor.

The particular structure of the present bracket is illustrated in FIG. 2 wherein an elongate plate 22 forms the central body of the bracket. The plate includes lateral edges 24 and 26 that extend downwardly to a generally heel-shaped end 28. This end portion of the plate includes several openings 30 formed therein to allow fasteners to pass therethrough and fasten the bracket to the tractor chassis as discussed hereinafter. The upper transverse end 32 of the bracket as detailed in FIG. 3 is seen to form an obtuse angle 34 with the lower lateral edge 26 of the bracket. The obtuse angle typically equals 130°.

A hook element generally indicated by reference numeral 36 is denoted in FIG. 2 and is seen to be attached to the upper transverse end 32 of the bracket. A plate component 38 of the hook element is suitably attached to the upper end 32 by welding or the like. A generally Y-shaped component 37 is perpendicularly mounted to the outward face of the plate component 38, the Y-shaped component 37 being substantially parallel with the upper end 32 of the bracket plate 22. The particular structure of the Y-shaped component 37 includes upwardly disposed arms 39 and 40. The arm 39 is perpendicularly connected to the outward surface of plate component 38 while arm 40 extends outwardly, the arms being separated from each other by a U-shaped notch 41. The central body portion 42 of the Y-shaped component extends downwardly and narrows inwardly 44 toward the outward surface of the plate component 38.

In FIG. 4, the proper mounting of bracket 10 is seen to be in rearwardly and upwardly inclined relation from the back end of a tractor chassis. Suitable bolt fasteners 47 pass through the apertures 30 (FIG. 2) and mount the bracket in cantilever fashion. The upwardly facing hooked end of the bracket is readily accessible to mount the auxiliary hydraulic motor 14. After mounting the motor, it is desirable to restrain the motor from unwanted jiggling or vibrating movement during periods when the tractor is moving. In order to accomplish this end, an abutment element 46 extends downwardly from the lower narrowed end of the Y-shaped component 37. The abutment 46 is preferably attached to the lower edge of plate component 38 and an adjacent area on the upper end of the lateral edge 26 of plate 22.

As will be seen in FIG. 3, the auxiliary hydraulic motor 14 is mounted to the hook end of the bracket by inserting the clevis pin 52 of clevis 50 in notch 41. The clevis 50 is fabricated from metal of approximately the same thickness as component 37 and is connected to the motor base support plate 48 and contacts the abutment 46 in such a manner that the motor 14 rests at a downward and rearward incline. Thus, the abutment 46 serves as a mechanical stop for the motor 14 and restricts unwanted motion of the motor during tractor movement.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a tractor of the type including a rear chassis portion having opposite sides from which rear drive axles project laterally, an upstanding elongated implement actuating fluid motor for use in actuating certain tractor drawn implements, and a support bracket for said motor to support the latter from said tractor when tractor implements are being changed or are not associated with the tractor, said support bracket including an elongated edge upstanding support plate having one end thereof overlying and secured to one side of said chassis portion with the other end thereof projecting rearwardly of said rear chassis portion, said other end of said plate including an edge upstanding plate component, means rigidly mounting said plate component on said other end as a rearward extension thereof, said plate component including an upper marginal portion having an upwardly opening transverse notch formed therein, said plate component further including a rearwardly and downwardly facing lower rear marginal portion defining an abutment surface and disposed forward of a vertical transverse plane extending along said notch, said motor being elongated and disposed in upstanding position, the upper end of said motor including a generally horizontal transverse plate having a forward transverse edge, said motor also including an upper bifurcated terminal end defined by an upwardly opening clevis disposed above said transverse plate and provided with a transverse clevis pin, said motor being removably supported from said plate component with said clevis pin seated in said notch and being positioned in rearwardly and downwardly inclined position with the forward transverse edge of said transverse plate abutted against said abutment surface so as to support said motor against unwanted swinging about the center axis of said clevis pin.

2. The combination of claim 1 wherein said means rigidly mounting said plate component on said other end of said support plate comprises an upstanding transverse plate rigidly attached to the rear edge of said support plate, said plate component including a forward edge rigidly attached to the rear face of said upstanding transverse plate.

* * * * *